United States Patent
Wurm

(10) Patent No.: US 7,658,391 B1
(45) Date of Patent: Feb. 9, 2010

(54) ENCLOSED AXLE DRIVE

(75) Inventor: Charles Richard Wurm, 722 N. 18th St., San Jose, CA (US) 95112

(73) Assignee: Charles Richard Wurm, San Jose, CA (US)

( * ) Notice: Subject to any disclaimer, the term of this patent is extended or adjusted under 35 U.S.C. 154(b) by 373 days.

(21) Appl. No.: 11/725,322

(22) Filed: Mar. 19, 2007

Related U.S. Application Data

(60) Provisional application No. 60/792,910, filed on Apr. 19, 2006.

(51) Int. Cl.
*B60B 37/06* (2006.01)

(52) U.S. Cl. ..................................... 280/80.1

(58) Field of Classification Search ............... 180/65.1, 180/907, 908; 254/389, 390, 393; 280/80.1
See application file for complete search history.

(56) References Cited

U.S. PATENT DOCUMENTS

| | | | | |
|---|---|---|---|---|
| 64,528 A * | 5/1867 | Hardcastle | ..................... | 5/258 |
| 405,978 A * | 6/1889 | Allen | ......................... | 105/108 |
| 2,717,071 A * | 9/1955 | Cook | ......................... | 198/842 |
| 3,633,432 A * | 1/1972 | Horsey | ....................... | 474/181 |
| 4,018,322 A * | 4/1977 | Brown et al. | .................. | 193/37 |
| 4,423,853 A * | 1/1984 | Davis, Sr. | ................... | 254/390 |
| 5,418,437 A | 5/1995 | Couture et al. | | |
| 5,553,380 A * | 9/1996 | Rice | ......................... | 29/895.2 |
| 5,921,338 A | 7/1999 | Edmondson | | |
| 6,041,476 A * | 3/2000 | deNormand | ................. | 16/197 |
| 6,179,078 B1 | 1/2001 | Belloso | | |
| 6,387,007 B1 | 5/2002 | Fini, Jr. | | |
| 6,880,654 B2 | 4/2005 | Plishner | | |
| 7,287,930 B2 * | 10/2007 | Yamasaki et al. | ............. | 404/10 |
| 2005/0045392 A1 | 3/2005 | Masloz et al. | | |
| 2006/0169506 A1 | 8/2006 | Handa et al. | | |
| 2006/0180365 A1 | 8/2006 | Innami et al. | | |

* cited by examiner

*Primary Examiner*—Lesley D. Morris
*Assistant Examiner*—Bryan A Evans

(57) ABSTRACT

The present application is to power an electric vehicle using this compact method of transmitting rotational energy and movement with three main parts, two of which are identical (33) (34). But this type of simple design could have nano-technology applications.

2 Claims, 8 Drawing Sheets

Figure 1:
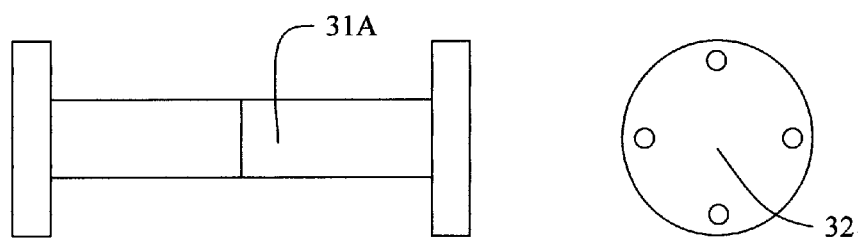

Fig. 8
Fig. 9
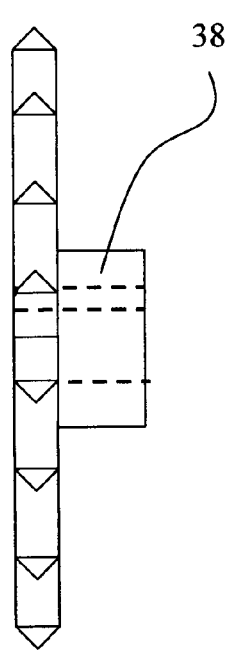
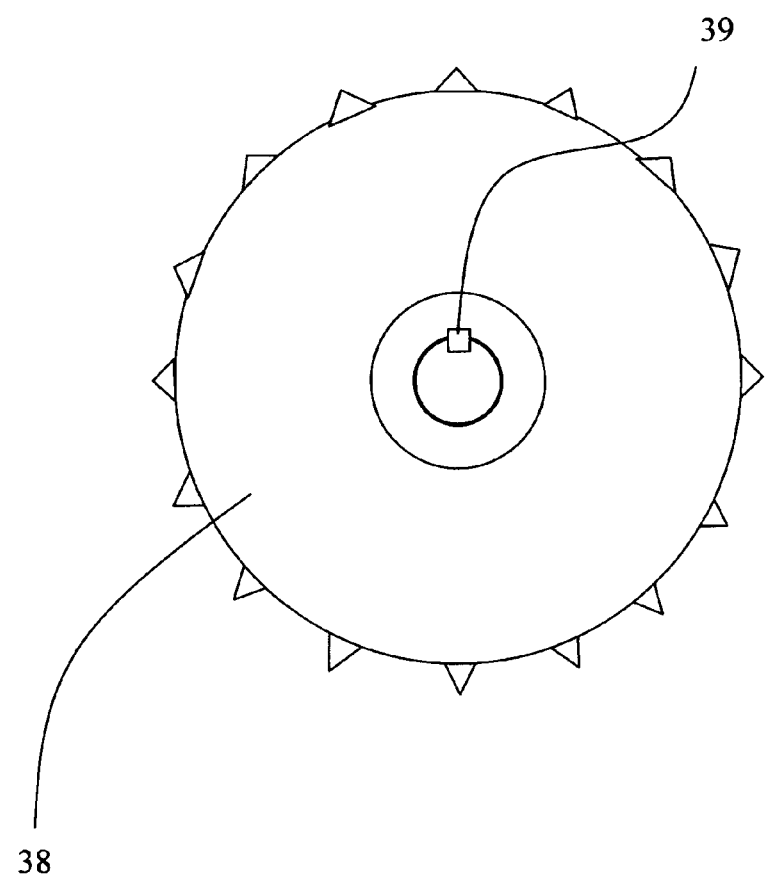

Fig. 12
Fig. 13 ←
Fig. 13
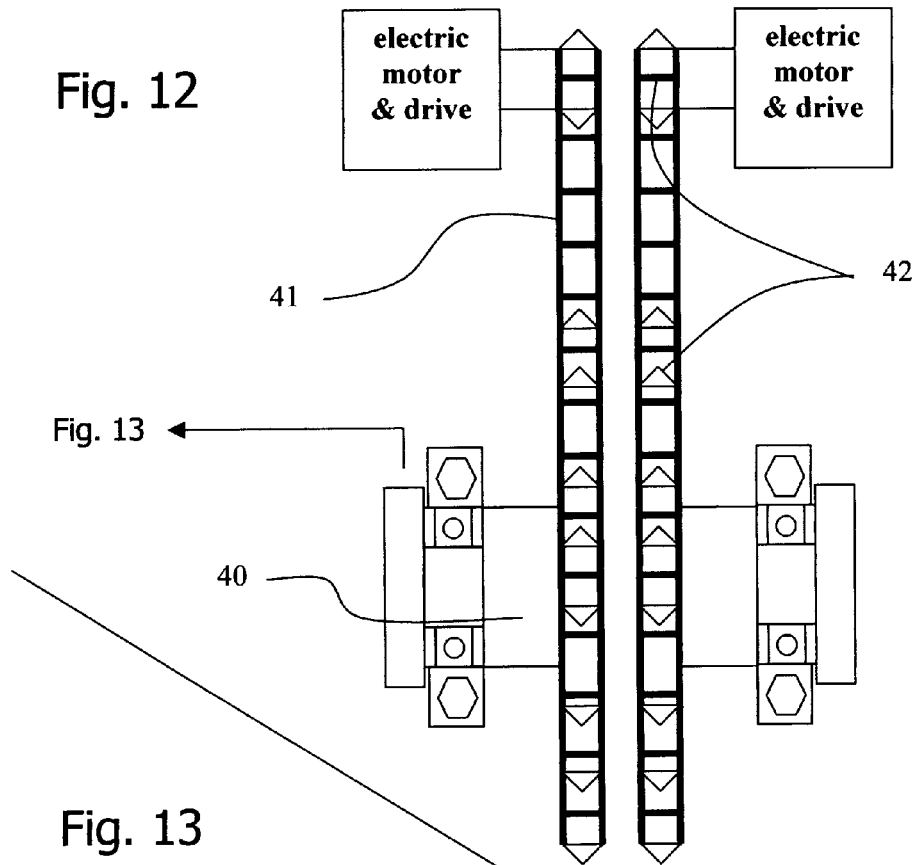
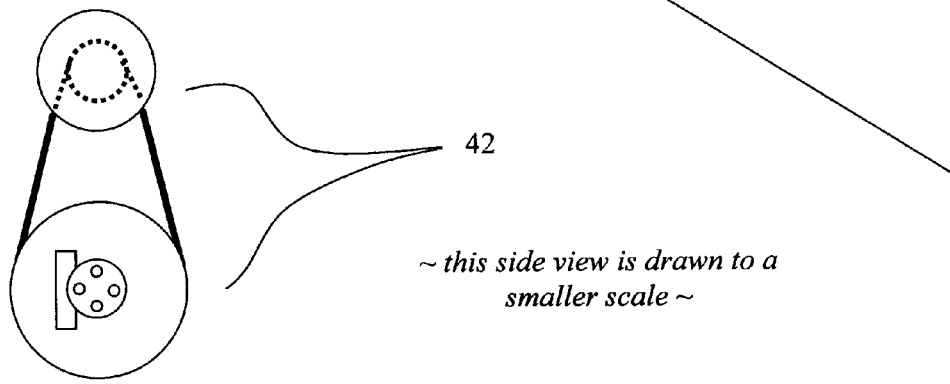
~ this side view is drawn to a smaller scale ~

Fig. 14
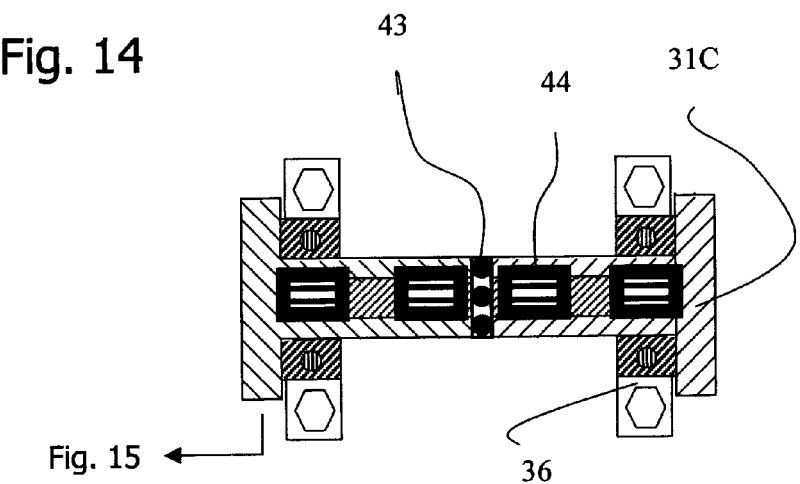
Fig. 15 ←
Fig. 15   ~ to show greater detail this end view is drawn to a larger scale ~
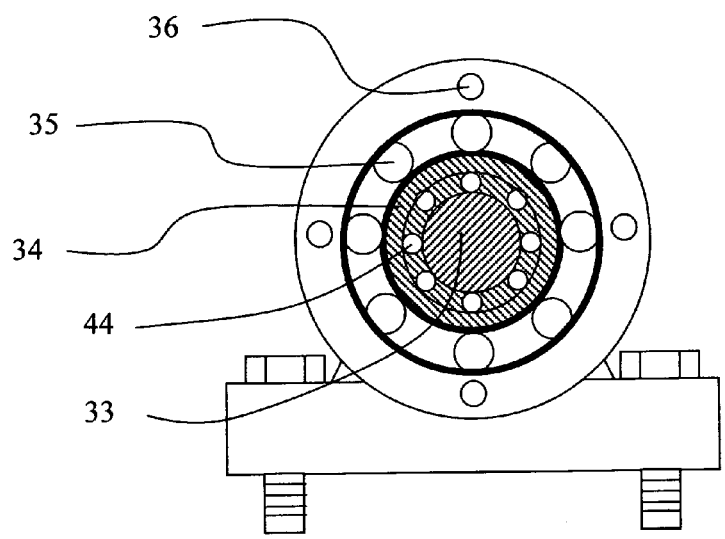

Fig. 16
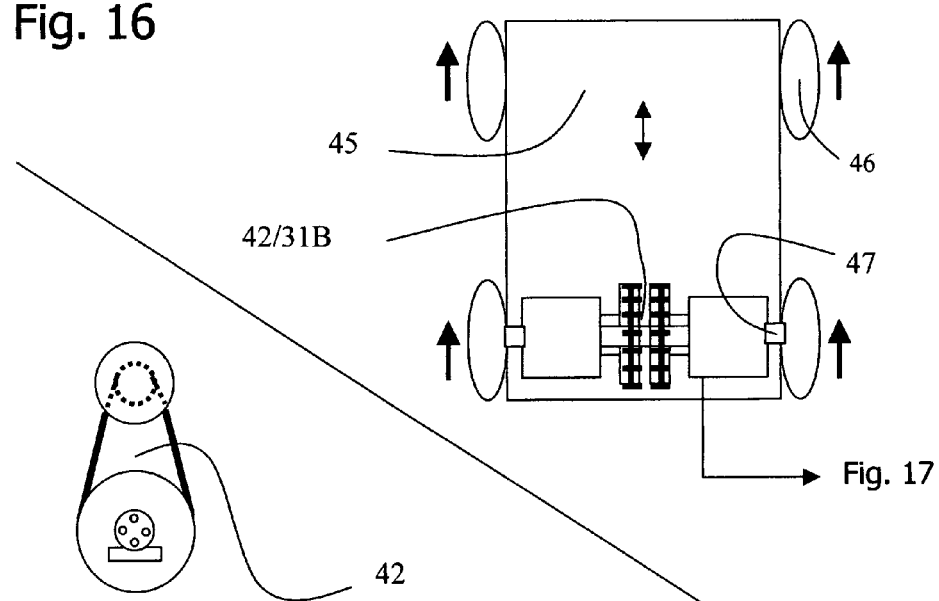
Fig. 17
Fig. 18
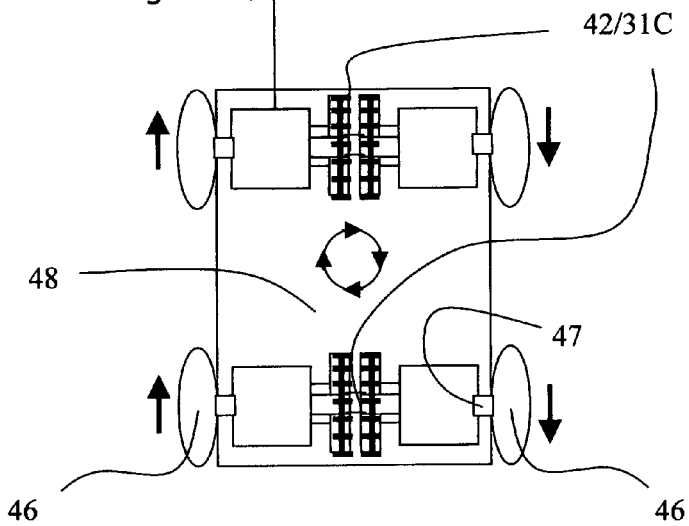

ENCLOSED AXLE DRIVE

CROSS-REFERENCE TO RELATED APPLICATIONS

This application claims the benefit of PPA Ser. No. 60/792,910 filed Apr. 19, 2006 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to mechanical drive systems, the application described is for an electric vehicle.

2. Prior Art

Vehicles powered by internal combustion engines move several parts in the engine and driveline before providing power to the wheels. Typically, flywheels, clutch assemblies, transmission shafts, gear clusters, differential gears, and final drive shafts are among these parts. Front wheel drive systems can be more efficient and the addition of automatic transmissions can be less efficient.

In all cases power and motion are translated from different rotational planes and sometimes directions before finally being used. Much of the energy required to move these parts and translate this motion is lost.

Efficiently Transmitting Vehicle Drive Power: One attempt to improve the efficiency of transmitting vehicle drive power to the wheels is U.S. Pat. No. 6,179,078 B1 Belloso (2001). This 'Fuel Efficient and Inexpensive Automobile' has independent internal combustion engines mounted at each rear wheel. In this way power is transmitted separately to each of the rear wheels to drive the vehicle forward through chains, belts and torque converters. The vehicle uses electric motors to power it in reverse. Both engines are used for acceleration. To improve fuel efficiency only one engine is used to maintain a desired speed.

This theory of operation seems reasonable. But synchronizing the operation of the separate engine drives would be difficult. An overpowered or underpowered engine or, an engine problem could unintentionally steer the vehicle. The power lost in the torque converters and the drive systems could be significant. High load or long distance rear wheel drive may not be possible.

Other improvements for efficiently transmitting vehicle drive power are shown in several electric and hybrid systems. In the following examples electric motors are directly coupled to the drive wheels or, are, part of the drive wheels. U.S. Pat. Nos.: 5,418,437 Couture et al, (1995), 5,921,338 Edmondson (1999), 6,880,654 B2 Plishner (2005), US 2005/0045392 Maslov et al. (2005), US 2006/0180365 Handa et al. (2006). But these designs lead to another problem, suspension arms with a high un-sprung weight.

High Un-Sprung Weight Suspension Arms: High un-sprung weight suspension arms are slower to move. Once in motion they are more difficult to control. And they are slower to return to their original position and be ready for additional movement.

For example, when potholes are driven over in the roadway the suspension arm(s) and drive wheel(s) are slow to move and find the new bottom. When bumps (small hills) are driven over in the roadway the suspension arm(s) and wheel(s) are slow to return to the roadway if they become airborne.

The slow movement of the high un-sprung weight suspension arm makes the drive wheel(s) stay in the air for a longer period of time. When wheels are not contacting the roadway they provide no traction. Vehicles with high un-sprung weight suspension arms hold the road poorly.

Objects and Advantages

The objects and advantages of the present Patent Application are:

(a) a simplified drive systems with three main parts;

(b) when the vehicle is moving in a straight line the three moving parts are not moving in relation to one another and create no friction between themselves. These parts rotate together as a single drive axle;

(c) these drive system parts can be located on the chassis reducing the un-sprung weight of the suspension arms;

(d) this drive system is a simple assembly with easy assess for inspection, lubrication or adjustment.

SUMMARY

The present invention is an efficient way to transmit power by reducing the number of moving parts without creating high un-sprung weight in the suspension arms.

DRAWINGS

Figures

FIG. 1 the side view and end view of the drive axle assembly.

Figure 2:
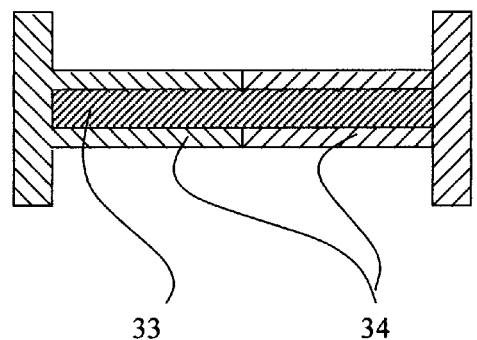

FIG. 2 a cross sectional side view of the drive axle assembly.

Figure 3:
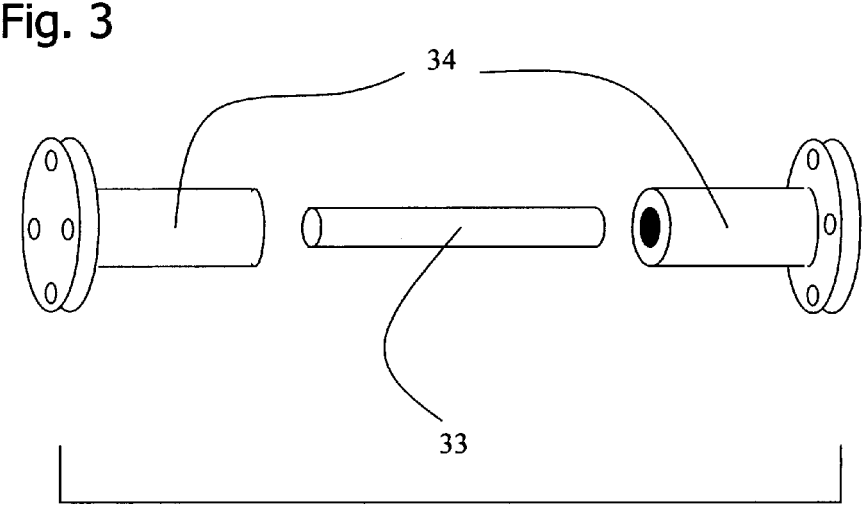

FIG. 3 an exploded view of the drive axle assembly.

Figure 4:
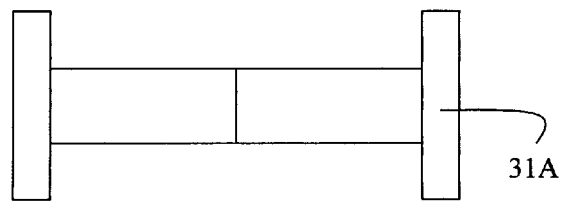

FIG. 4 a side view of the drive axle assembly.

Figure 5:
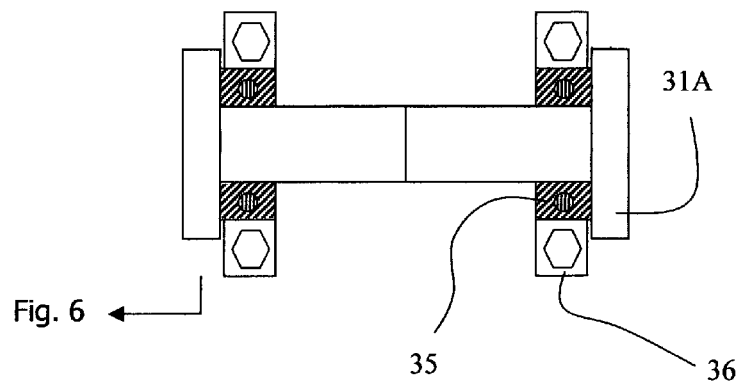

FIG. 5 a side view of the drive axle assembly with bearings.

Figure 6:
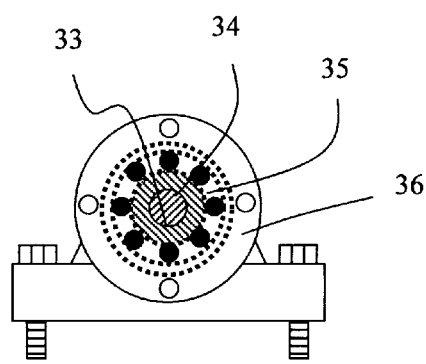

FIG. 6 is a cross sectional end view of the drive axle assembly with bearings.

Figure 7:
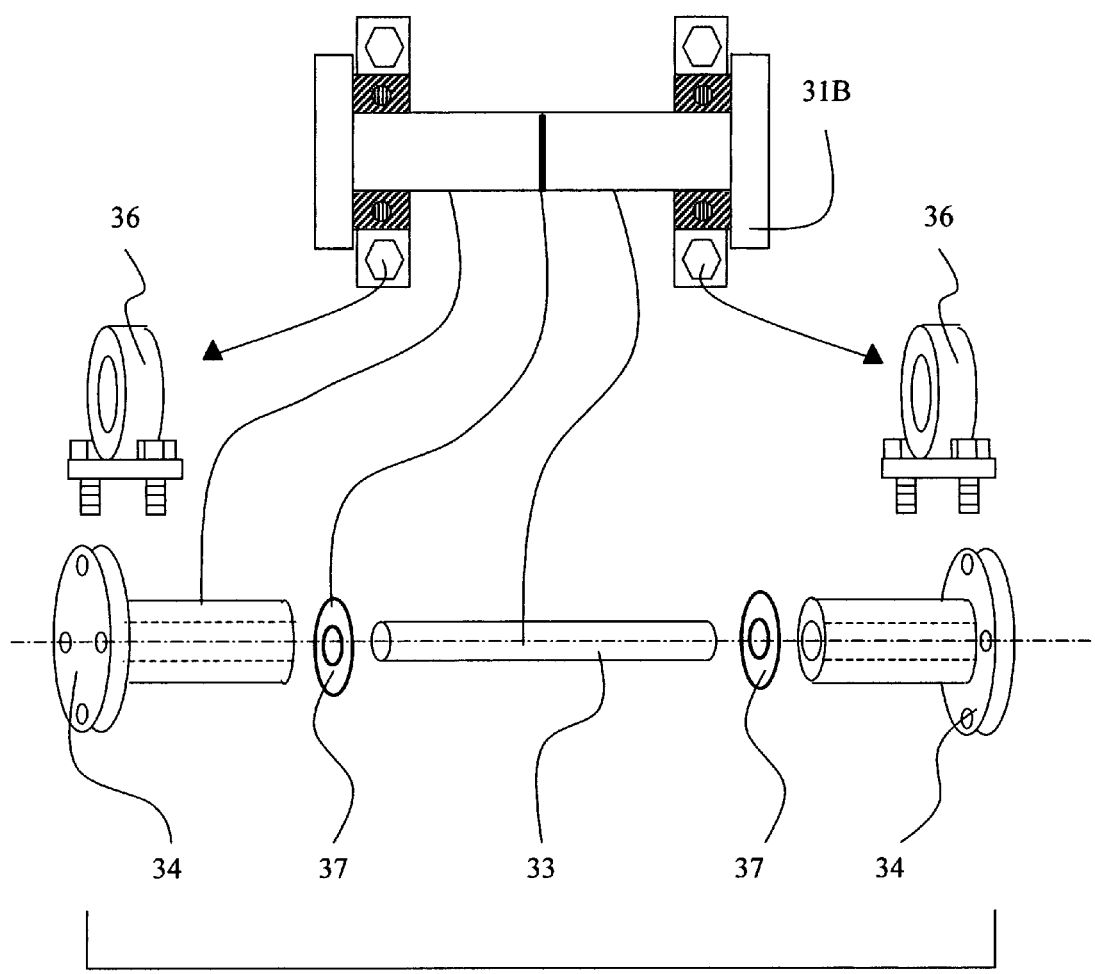

FIG. 7 an exploded side view of the drive axle assembly with ball bearings and thrust washers.

FIG. 8 a straight on view of the drive sprocket (as if it were against an invisible wall).

FIG. 9 the side view of the drive sprocket and hub showing the key for securing the sprocket to an external hollow axle half shaft.

Figure 10:
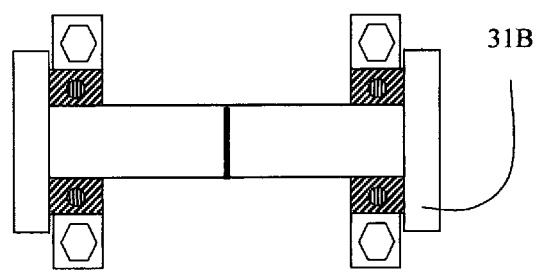

FIG. 10 a side view of the drive axle assembly with ball bearings and thrust washers.

Figure 11:
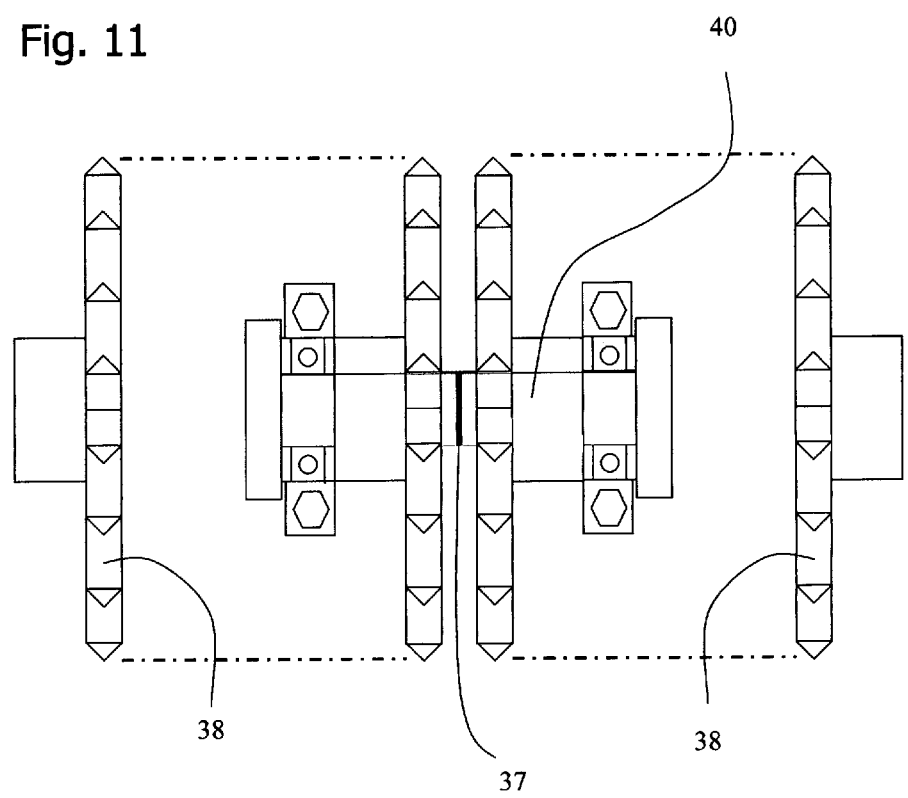

FIG. 11 drive sprockets installed over the drive axle assembly with ball bearings and thrust washers.

FIG. 12 the drive axle assembly with ball bearings and thrust washers connected to electric motors with drive sprockets. A separate chain connects each motor drive sprocket to each axle drive sprocket. This is the complete drive assembly.

FIG. 13 a side view of the complete drive assembly.

FIG. 14 a cross sectional view of the drive axle assembly with the installation of two roller bearings within each external hollow axle half shaft (four roller bearings total). A single ball bearing is between the external axle half shafts replacing the thrust washers.

FIG. 15 a cross sectional end view of the drive axle assembly with roller bearings.

FIG. 16 view from above of a two wheel drive vehicle using the drive axle assembly without roller bearings.

FIG. 17 the side view of the complete drive assembly.

FIG. 18 view from above of a four wheel drive vehicle using the basic drive assembly with roller bearings.

REFERENCE NUMERALS

31A side view of the drive axle assembly from any side.
31B side view of the drive axle assembly from any side with thrust washers shown over inner drive shaft between external hollow axle half shafts.
31C cross sectional side view of the drive axle assembly from any side. Ball bearing between axle half shafts replacing thrust washers and roller bearings installed within the external half shaft axles supporting the inner axle.
32 end view of the drive system assembly from either end.
33 inner axle shaft
34 external hollow axle half shafts.
35 bearings surrounding each of the external axle half shafts.
36 bearing housing with bolt heads shown. In the exploded view these housings are rotated 90 degrees from their assembled position.
37 thrust washers
38 drive sprocket
39 key (within keyway of drive sprocket)
40 assembly: drive sprockets keyed to axles
41 drive chain
42 drive assembly: electric motors connected to axle drive sprockets with chains
42/31B assembly: electric motors connected to axle drive sprockets with chains. Inner axle assembly has thrust washers between external axle half shafts and no inner roller bearings.
42/31C assembly: electric motors connected to axle drive sprockets with chains. Inner axle assembly has ball bearing between external axle half shafts and roller bearings within external axle half shafts supporting the inner axle.
43 ball bearing
44 roller bearing
45 two wheel drive vehicle
46 rotating wheel: arrow represents the drive motion transmitted to the vehicle
47 axle shaft connecting drive assembly to wheel
48 four wheel drive vehicle

DETAILED DESCRIPTION

FIG. 1 thru 11

Preferred Embodiment

A preferred embodiment of the drive axle assembly for the present invention is described in FIG. 1, FIG. 2 and FIG. 3. FIG. 3 is an exploded view of the basic drive axle assembly.

This assembly consists of 3 main pieces. The inner axle shaft (33) is surrounded by two external hollow axle half shafts (34). The external hollow axle half shafts are identical. This complete assembly is a single axle of 3 parts (31A). All these parts are coated with a dry lubricant when assembled.

FIG. 4, FIG. 5 and FIG. 6 show the basic axle assembly (31A) with bearings (35) and bearing housings (36).

FIG. 7 shows an exploded view of the assembly (31B) with the addition of thrust washers (37) over the inner axle shaft (33) and between the two external hollow axle half shafts (34). This complete drive axle assembly rests within two ball bearing assemblies (36). These bearings are placed just inside the outside flanges of the external hollow axle half shafts (34). These flanges (with four bolts holes in each) are where drive axles to the wheels are connected (47).

The drive sprocket shown in FIG. 8 & FIG. 9 is keyed to and placed over the drive axle assembly (31B) shown in FIG. 7. This complete assembly (40) is shown in FIG. 11.

Assembly (40) is connected to electric motors and drive sprockets with chains (41) in FIG. 12. This is the complete drive assembly (42). The side view is shown in FIG. 13.

Operation

Preferred Embodiment

FIG. 12, FIG. 16

Assembly (42) using the inner axle assembly (31B) is for an axle drive where both external hollow axle half shafts move in the same direction at the same or similar speeds. This combination is represented by the reference number 42/31B in FIG. 16. In this configuration Parts 33 and 34 are moving together and there is little or no movement between them. This would be the most common use of this axle assembly when powering a vehicle (45). FIG. 16 shows a rear wheel drive vehicle powered in this manner and (46) represents the direction the wheels power the vehicle.

DESCRIPTION

Additional Embodiment

FIG. 12, FIG. 16. FIG. 18

This embodiment is identical to the one described in the previous Preferred Embodiment section with the exchange of Assembly 31C for Assembly 31B. This exchange of assemblies is represented by the reference number 42/31C in FIG. 18.

Operation

Additional Embodiment

FIG. 12, FIG. 14

The exchange of assemblies 31B for 31C allows each of the external hollow half shafts (34) to rotate in different directions or at much different speeds for prolonged periods of time around the common inner axle shaft (33). Motors could also be removed from operation and their external hollow half shafts stopped.

FIG. 18 shows the use of this axle assembly when powering a vehicle (48). This type of vehicle with four wheel steering could turn around within the diameter of its own length. In FIG. 18 Reference Number 46 represents the direction of wheels in this type of turn around.

This configuration would also allow the vehicle to move with different orientations of the body. Not necessarily just forward, backward, or turning.

I claim:

1. A system to transmit rotational energy, comprised of:
   (a) a single inner round axle shaft, and
   (b) two hollow outer round axle shafts with approximately the same inside diameter, the inside diameter of said hollow round axle shafts will be slightly greater than the outside diameter of said single round axle shaft, the lengths of said hollow outer round axle shafts will be approximately equal and half the length of said single round axle shaft, and wherein only one end of each outer axle shaft is open, (c) said hollow outer axle shafts completely cover and enclose the inner axle shaft such that the faces of the outer axle shafts with the open ends abut one another when fully enclosing the inner axle and the ends of the inner shaft are flush to the inner side of the closed end of the outer shafts, (d) lubricant placed within the shaft assembly is restricted from leaving the enclosed axle shaft assembly and debris is prevented from entering the enclosed axle shaft assembly, (e) two fixed bearings are placed over the outer shafts of the axle shaft assembly such that each end of the inner axle shaft within the outer shaft contacts an inner face of the outer shaft in the same plane as an outside face of the bearing contacts the end of the outer shaft wherein this positioning restricts the movement of the outer axle shafts away from a parallel center to center alignment with said inner axle shaft and evenly spreads any force of such potential misalignment along the entire length of the inner axle shaft and limits any end to end movement of the entire enclosed axle shaft assembly, wherein said fixed bearings each have, (f) drive gear hubs on an inside face of the bearings help restrict the assembly's movement, thus maintaining the relative positions of all axles and bearings.

2. A system to transmit rotational energy as recited in claim 1 wherein said single axle shaft assembly rotates as a single axle with no internal moving parts when the hollow round axle half shafts receive the same rotational energy or as independent axles rotating at different speeds or in different directions when the hollow round axle half shafts receive different rotational energy.

\* \* \* \* \*